United States Patent Office 2,977,369
Patented Mar. 28, 1961

2,977,369

PRODUCTION OF 2-OXAZOLIDINONES

Stanley Dixon, Brandywine Hundred, and John J. Verbanc, New Castle, Del., assignors to E. I. du Pont de Nemours and Company, Wilmington, Del., a corporation of Delaware No Drawing. Filed Apr. 13, 1959, Ser. No. 805,667

3 Claims. (Cl. 260—307)

This invention relates to a process for preparing 2-oxazolidones and more particularly to an improvement in the process for preparing 2-oxazolidones from epoxides and organic isocyanates or their dimers, the 1,3-diazacyclobutane-2,4-diones.

It is an object of the present invention to provide a process for preparing 2-oxazolidones. A further object is to provide an improvement in the process for preparing 2-oxazolidones from epoxides and organic isocyanates or their dimers, the 1,3-diazacyclobutane-2,4-diones. Other objects will appear hereinafter.

These and other objects of this invention are accomplished by the process comprising heating a mixture of an organic isocyanate or the corresponding dimer, the 1,3-diazacyclobutane-2,4-dione, with an epoxide in the presence of a catalyst and recovering the 2-oxazolidone thereby obtained.

The organic isocyanates which are used in the process of this invention may be represented by the formula R—NCO, wherein R is an organic radical which is free of epoxide reactable groups, such as an aliphatic, aromatic, mixed aliphatic-aromatic radical or an organic polymer radical. Representative organic isocyanates include methyl isocyanate,
chloromethylisocyanate,
ethylisocyanate,
β-chloroethylisocyanate,
butylisocyanate,
tert-butylisocyanate,
octylisocyanate,
octadecylisocyanate,
cyclopentylisocyanate,
cyclohexylisocyanate,
decahydronaphthylisocyanate,
3-chlorocyclohexylisocyanate,
2,5-dimethylcyclohexylisocyanate,
2-methoxycyclohexylisocyanate,
allylisocyanate,
pentenylisocyanate,
phenylisocyanate,
p-chlorophenylisocyanate,
o-tolylisocyanate,
m-nitrophenylisocyanate,
m-bromophenylisocyanate,
p-methoxyphenylisocyanate,
p-carbomethoxyphenylisocyanate,
4-biphenylisocyanate,
p-dimethylaminophenylisocyanate,
4-ethyl-6-nitro-o-tolylisocyanate,
m-fluorophenylisocyanate,
2,3,5,6-durylisocyanate,
2,4,6-mesitylisocyanate,
1-naphthylisocyanate,
2-naphthylisocyanate,
5-nitro-1-naphthylisocyanate,
4(4-pentenyl)-phenylisocyanate,
3-isocyanatopyrene,
benzylisocyanate,
3-chlorobenzylisocyanate, and
4-ethoxy-benzylisocyanate.

The isocyanate-terminated polymers include polyethers, polyesters, polyformals, poly-N-alkyl substituted amides, polyester-N-alkyl substituted amides, poly-N-alkyl substituted ureas, poly-N-alkyl substituted urethanes, polyaldehydes and polycarbonates. In general any organic isocyanate may be used so long as the organic radical is free of any epoxide reactive groups. Such groups include all groups bearing hydrogen atoms which are active as determined by the Zerewitinoff test, i.e., such groups as acetamido, acetimido, amino, amido, carbamyl, carboxyl, diazoamino, hydrazino, hydrazo, hydrazono, hydroxamino, hydroxyl (alcoholic, phenolic), imido, imino, isonitro, isonitroso, mercapto, nitroamino, oxamyl, phosphinico, phosphino, phosphono, selenino, selenono, selenyl, silicono, stibinico, stibino, stibono, stibylene, sulfamino, sulfamyl, sulfino, sulfo, thiocarbamyl, triazeno, ureido, ureylene, and urethaneo.

In place of the organic isocyanates one may use the corresponding dimers which are called 1,3-diazacyclobutane-2,4-diones and have the structure

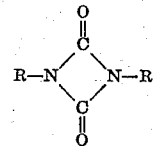

wherein R is as defined above. The R's need not be the same. Representative isocyanate dimers include:

1,3-bis(4-ethoxyphenyl)-1,3-diazacyclobutane-2,4-dione,
1,3-bis(m-tolyl)-1,3-diazacyclobutane-2,4-dione,
1,3-diphenyl-1,3-diazacyclobutane-2,4-dione,
1,3-bis(3-chlorophenyl)-1,3-diazacyclobutane-2,4-dione,
1,3-bis(4-biphenyl)-1,3-diazacyclobutane-2,4-dione,
1,3-bis(4-bromophenyl)-1,3-diazacyclobutane-2,4-dione,
1,3-dinaphthyl-1,3-diazacyclobutane-2,4-dione, and
1,3-pyrenyl-1,3-diazacyclobutane-2,4-dione.

Under the conditions of the subject process, these dimers dissociate to provide the parent organic isocyanate R—NCO or isocyanates, when the R's are different. The dimers are prepared by contacting organic isocyanates with certain catalysts such as trialkyl phosphines, pyridine or triethylamine.

It is to be understood that when mixtures of isocyanates are used a product mixture of all the possible 3-substituted-2-oxazolidones may be formed. Mixtures of epoxides in like manner lead to mixed 2-oxazolidones.

The epoxides which are used in the process of this invention may be represented by the formula

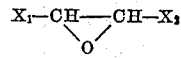

wherein $X_1$ and $X_2$ are hydrogen or organic radicals which are free of epoxide reactive groups. It is to be understood that $X_1$ and $X_2$ need not necessarily be the same in each compound. $X_1$ and $X_2$ may be joined together to form a cyclic epoxide. Representative epoxides include ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 3-chloro-1,2-epoxypropane, 1,2-epoxy-5-hexene, 1,2-epoxy-2-cyclohexylpropane and 1,2-epoxy-3-butene.

In carrying out the process of this invention the epoxide is heated with the organic isocyanate, or the corresponding dimer, in the presence of a catalyst and the resulting 2-oxazolidone then recovered. By carrying out this reaction in the presence of a catalyst, the amount of 2-oxazolidone obtained is greater than when the reaction is carried out without using a catalyst. In addition, the use of a catalyst permits the reaction to be carried out at a lower temperature as compared with the process wherein the catalyst is not used. The reaction should be carried out at a temperature of between about 150 to about 220° C. for a period of time of from about 1 to about 5 hours.

It is preferred that approximately stoichiometric proportions of the reactants be used, i.e., about one molecule of epoxide be supplied for every molecule of the isocyanate reactant and when the dimer is used, about 2 molecules of epoxide be supplied per mole of dimer. The use of less epoxide results in a decreased yield of 2-oxazolidone. Excess epoxide may be used, such as about 2 to 4 molecules per mole of isocyanate monomer or dimer, respectively; however more than this amount may cause undesired side reactions.

The process of this invention may be carried out at atmospheric pressure provided the vapor pressure of the mixture of reactants is low enough. Often the reactants, particularly the epoxides, are too volatile in which event the reaction is conducted at superatmospheric pressure. Such a reaction may be carried out in an autoclave or rocker bomb. In general, the reactor will have an inert lining such as glass, enamel, stainless steel or lead. It is not necessary to use any higher pressure than that exerted by the reaction mixture at the operating temperature. When the formation of the 2-oxazolidone consumes a more volatile reactant, the drop in pressure may be used to follow the progress of the reaction.

In general the reactants are mixed at temperatures below about 150° C. and brought to the operating temperature, i.e., 150 to 220° C., by application of external heat. If the reactants are heated too rapidly, the reaction may get out of control. A rapid temperature rise will occur and undesired by-products will be formed. If desired, the reactants may be heated separately to the desired operating temperature and then slowly introduced in stoichiometric proportions into an agitated reactor at the reaction temperature.

The catalysts which are used in the subject process may be added at any time. Thus, it may be introduced into the isocyanate reactant or the epoxide reactant, or both, immediately prior to mixing or it can be added to the reaction mixture below or at the desired operating temperature. Catalysts which may be used include the metal salts of carboxylic acids, tri(lower alkyl)phosphines and tri(lower alkyl)arsines. It is to be understood that these catalysts contain no epoxide reactable substituents or any groups bearing active hydrogen atoms (e.g. amido, amino, arsinico, arsino, arsono, arsylene, carbamyl, diazoamino, hydrazino, hydrazo, hydrazono, hydroxamino, hydroxyl, imido, imino, isonitro, isonitroso, mercapto, nitramino, oxamyl, phosphinico, phosphino, phosphono, selenino, selenono, silenyl, semicarbazido, silicono, silicyl, silicylene, stannyl, stibinico, stibino, stibono, stibylene, sulfamino, sulfamyl, sulfino, sulfo, sulfonamido, thiocarbamyl, triazeno, ureido and urethaneo). In general about 0.01 to 5% catalyst is used by weight of the reaction mixture. The preferred concentration ranges from about 0.5 to 2% by weight. The preferred catalyst is lead naphthenate. The basic metal salts of carboxylic acid which may be used are made by reacting an aliphatic or aromatic carboxylic acid with oxides or hydroxides of metals of groups I, IA, IB, II, IIA, IIB, IIIA, IIIB, IVA, VA, VB, VIA, VIB, VIIA, VIII, Al, and Pb. Representative salts are lead naphthenate, cobalt naphthenate, copper naphthenate, lead octanoate, lead linoresinate, iron linoleate, calcium acetate, potassium acetate, sodium formate, sodium methoxide, vanadium octanoate, manganese naphthenate, potassium adipate, zinc succinate, aluminum tert-butoxide, chromium linoleate, cadmium stearate, sodium benzoate, zinc stearate, lead linoleneate, cerium naphthenate, zironium naphthenate, vanadium linorescinate. In general, the salts are made from (A) acids such as saturated monobasic aliphatic carboxylic acids, monobasic unsaturated aliphatic carboxylic acids, dibasic aliphatic acids, polybasic aliphatic acids, aromatic carboxylic acids, naphthenic acids and rosin acids; and (B) hydroxides and oxides of metals such as sodium, magnesium, aluminum, potassium, calcium, scandium, titanium, vanadium, chromium, manganese, iron, cobalt, nickel, copper, zinc, gallium, rubidium, strontium, yttrium, zirconium, columbium, molybdenum, rhenium, silver, cadmium indium, cesium, barium, lanthanum, tungsten, osmium, silver, and thallium. Representative examples of tri(lower alkyl)phosphines and tri(lower alkyl)arsines include triethyl phosphine and triethyl arsine, respectively.

When the process is conducted at atmospheric pressure, analysis of the products obtained from trial runs will be required to determine the time needed to complete the reaction. When a superatmospheric process is operated, the end of the reaction is usually indicated by a halt in the pressure drop. In any event, the reaction vessel is allowed to cool until it can be opened conveniently. The 2-oxazolidone obtained is purified by conventional techniques of fractional distillation and recrystallization. For example, 3-phenyl-2-oxazolidone is conveniently recovered by contacting the reaction mixture with hot tetrahydrofuran. The oxazolidone dissolves and the addition of n-hexane to the filtrate precipitates the oxazolidone which is finally recrystallized from a mixture of n-hexane and tetrahydrofuran.

The 2-oxazolidones, which are prepared by the process of this invention, may be defined by the formula

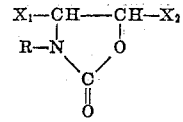

wherein R, $X_1$ and $X_2$ are as defined above. These compounds are useful as solvents and plasticizers for cellulose esters and acrylic polymers.

The following example will better illustrate the nature of the present invention; however the invention is not intended to be limited to this example. Parts are by weight unless otherwise indicated.

*Example*

55 grams of phenylisocyanate, 20 grams of ethylene oxide, and 0.5 gram of lead naphthenate are agitated at 150° C. for 4 hours in a 400-cc. stainless steel bomb. On cooling, 71 grams of 3-phenyl-2-oxazolidone is removed from the bomb as a light brown solid melting (without purification) at 117–120° C.

As many widely different embodiments of this invention may be made without departing from the spirit and scope thereof, it is to be understood that this invention is not limited to the specific embodiments thereof except as defined in the appended claims.

What is claimed is:

1. In the process for preparing a 2-oxazolidone by heating a mixture consisting of approximately stoichiometric proportions of (a) an epoxide selected from the group consisting of ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 3-chloro-1,2-epoxypropane, 1,2-epoxy-5-hexene, 1,2-epoxy-2-cyclohexylpropane and 1,2-epoxy-3-butene and (b) a compound selected from the group consisting of an organic isocyanate of the formula R—NCO and a 1,3-diazacyclobutane-2,4-dione of the formula

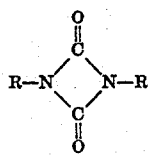

wherein R is an organic radical selected from the group consisting of alkyl, haloalkyl, cycloalkyl, halo-substituted cycloalkyl, alkyl-substituted cycloalkyl, alkoxy-substituted cycloalkyl, alkenyl, hydrocarbon aryl, halo-substituted hydrocarbon aryl, nitro-substituted hydrocarbon aryl, alkoxy-substituted hydrocarbon aryl, carboalkoxy-substituted hydrocarbon aryl, aminoalkyl-substituted hydrocarbon aryl and alkenyl-substituted hydrocarbon aryl, the improvement comprising carrying out the reaction at a temperature of from about 150° C. to 220° C. in the presence of a catalyst selected from the group consisting of lead salts of hydrocarbon carboxylic acids, tri(lower alkyl)phosphines and tri(lower alkyl)arsines.

2. A process according to claim 1 wherein the catalyst is lead naphthenate.

3. A process according to claim 2 wherein the reaction is carried out at a temperature of about 150° C. for about 4 hours.

References Cited in the file of this patent
UNITED STATES PATENTS

| | | |
|---|---|---|
| 2,594,979 | Nelson | Apr. 29, 1952 |
| 2,602,075 | Carpenter et al. | July 1, 1952 |
| 2,788,335 | Barthel | Apr. 9, 1957 |
| 2,799,663 | Hampton et al. | July 16, 1957 |
| 2,865,926 | Harrington | Dec. 23, 1958 |

FOREIGN PATENTS

| | | |
|---|---|---|
| 860,471 | France | Dec. 12, 1941 |

OTHER REFERENCES

Krasuskii et al.: Chem. Abstracts, vol. 31, col. 1377 (1937).

Elderfield: "Heterocyclic Compounds," vol. 5, pp. 397–8 (1957).

Jones et al.: J. Chem. Soc., pages 4392–4 (1957).

Speranza et al.: J. Org. Chem., vol. 23, pages 1922–4 (1958).

UNITED STATES PATENT OFFICE
CERTIFICATION OF CORRECTION

Patent No. 2,977,369  March 28, 1961

Stanley Dixon et al.

It is hereby certified that error appears in the above numbered patent requiring correction and that the said Letters Patent should read as corrected below.

Column 4, line 4, for "zironium" read -- zirconium --; column 6, line 14, list of references cited, under FOREIGN PATENTS, for "860,471" read -- 870,471 --.

Signed and sealed this 22nd day of August 1961.

(SEAL)
Attest:

ERNEST W. SWIDER
Attesting Officer

DAVID L. LADD
Commissioner of Patents